United States Patent

Moriyama

(10) Patent No.: US 12,368,156 B2
(45) Date of Patent: Jul. 22, 2025

(54) MOISTURE POWDER AND METHOD FOR MANUFACTURING NON-AQUEOUS ELECTROLYTE SECONDARY BATTERY INCLUDING ELECTRODE COMPOSED OF SAID MOISTURE POWDER

(71) Applicant: Prime Planet Energy & Solutions, Inc., Tokyo (JP)

(72) Inventor: Satoshi Moriyama, Nagoya (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 632 days.

(21) Appl. No.: 17/706,600

(22) Filed: Mar. 29, 2022

(65) Prior Publication Data

US 2022/0320486 A1 Oct. 6, 2022

(30) Foreign Application Priority Data

Apr. 1, 2021 (JP) ................. 2021-063001

(51) Int. Cl.
*H01M 4/139* (2010.01)
*H01M 4/04* (2006.01)
(Continued)

(52) U.S. Cl.
CPC ......... *H01M 4/139* (2013.01); *H01M 4/0404* (2013.01); *H01M 4/043* (2013.01); *H01M 4/62* (2013.01); *H01M 10/0525* (2013.01)

(58) Field of Classification Search
CPC ............. H01M 4/0404; H01M 4/0411; H01M 4/0416; H01M 4/043; H01M 4/0433; H01M 4/0435; H01M 4/13; H01M 4/139; H01M 4/1391; H01M 4/1393; H01M 10/049; H01M 10/0525; H01M 10/058;
(Continued)

(56) References Cited

U.S. PATENT DOCUMENTS

| | | | |
|---|---|---|---|
| 6,013,393 A | 1/2000 | Taniuchi et al. | |
| 2016/0204438 A1* | 7/2016 | Umeyama | H01M 4/1391 427/58 |

(Continued)

FOREIGN PATENT DOCUMENTS

| | | | | |
|---|---|---|---|---|
| CN | 110521032 A | 11/2019 | | |
| EP | 3567668 A1 * | 11/2019 | .......... | H01M 10/052 |

(Continued)

OTHER PUBLICATIONS

EP-3567668 translation from FIT database (Year: 2025).*

*Primary Examiner* — Jeffrey T Carley
*Assistant Examiner* — Joshua D Anderson
(74) *Attorney, Agent, or Firm* — HAUPTMAN HAM, LLP (57) ABSTRACT

A moisture powder disclosed herein is for forming an electrode active material layer on any of positive and negative electrode current collectors, the moisture powder being configured of aggregated particles including an electrode active material and a non-aqueous electrolytic solution, wherein a solid content ratio is 70% by mass or more when the total amount of the moisture powder is 100% by mass, the non-aqueous electrolytic solution includes a non-aqueous solvent and a support salt, and a viscosity of the non-aqueous electrolytic solution at 25° C. is 25 mPa·S or more and 130 mPa·S or less.

3 Claims, 3 Drawing Sheets

(51) Int. Cl.
*H01M 4/62* (2006.01)
*H01M 10/0525* (2010.01)

(58) Field of Classification Search
CPC ......... H01M 10/0583; H01M 10/0585; H01M 10/0587; Y10T 29/49108; Y10T 29/49115
See application file for complete search history.

(56) References Cited

U.S. PATENT DOCUMENTS

| | | | | |
|---|---|---|---|---|
| 2016/0240847 | A1* | 8/2016 | Kinoshita | ............... H01M 4/62 |
| 2017/0309945 | A1* | 10/2017 | Umeyama | ........... H01M 4/0435 |
| 2020/0136125 | A1 | 4/2020 | Suenaga et al. | |

FOREIGN PATENT DOCUMENTS

| | | |
|---|---|---|
| JP | H973917 A | 3/1997 |
| JP | 2015521783 A | 7/2015 |
| JP | 201798029 A | 6/2017 |
| JP | 2017117582 A | 6/2017 |
| JP | 2017533548 A | 11/2017 |
| JP | 2018113113 A | 7/2018 |
| JP | 202115776 A | 2/2021 |
| WO | 2013188265 A1 | 12/2013 |
| WO | 2016073575 A1 | 5/2016 |
| WO | 2020/061677 A1 | 4/2020 |

\* cited by examiner

MOISTURE POWDER AND METHOD FOR MANUFACTURING NON-AQUEOUS ELECTROLYTE SECONDARY BATTERY INCLUDING ELECTRODE COMPOSED OF SAID MOISTURE POWDER

CROSS REFERENCE TO RELATED APPLICATIONS

The present application claims priority from Japanese Patent Application No. 2021-063001 filed on Apr. 1, 2021, which is incorporated by reference herein in its entirety.

BACKGROUND OF THE DISCLOSURE

1. Technical Field

The present disclosure relates to a moisture powder and a method for manufacturing a non-aqueous electrolyte secondary battery including an electrode composed of the moisture powder.

2. Description of Background

Since secondary batteries such as lithium ion secondary batteries are lighter and have a higher energy density than conventional batteries, the secondary batteries are preferably used as high-output power sources for mounting on vehicles or as power sources for personal computers and mobile terminals. In particular, lithium ion secondary batteries are preferably used as high-output power sources for driving vehicles such as battery electric vehicles (BEVs), hybrid electric vehicles (HEVs), and plug-in hybrid electric vehicles (PHEVs).

Positive and negative electrodes (hereinafter, simply referred to as "electrode" when the positive and negative electrodes are not specifically distinguished) provided in this type of secondary battery typically have a structure in which an electrode active material layer including an electrode active material as a main component is formed on one or both sides of a foil-shaped electrode current collector. Such electrode active material layer is formed by dispersing solid components such as an electrode active material, a binding material (binder), and a conductive material in a predetermined solvent to prepare a slurry (paste)-like electrode material, coating the electrode material on the surface of an electrode current collector to form a coating film, drying the coating film, and then applying a pressing pressure to obtain predetermined density and thickness. Alternatively, instead of forming a film with such a mixed material slurry, moisture powder sheeting (MPS) is also being investigated in which a film is formed using a so-called moisture powder in which a proportion of solid components is relatively higher than that of the mixed material slurry and granular aggregates are formed in a state where a solvent is held on the surface of active material particles and the surface of binder molecules.

Japanese Patent Application Publication No. 2018-113113 discloses a moisture composition which includes an active material, a binder, a solvent, and a surfactant, and in which the contact angle of the active material with respect to a mixed liquid of the solvent and the surfactant is adjusted to 10° or more and 80° or less. It is disclosed that by using such a moisture composition, an electrode active material layer having a uniform thickness can be formed on a current collector foil. Further, Japanese Patent Application Publication No. 2017-117582 discloses a method for manufacturing a secondary battery including a step of preparing a granulated product including a part of a solvent component of an electrolytic solution in order to improve the spreadability of the granulated product while suppressing deterioration of battery performance.

SUMMARY

As described in Japanese Patent Application Publication No. 2017-117582, when the solvent conventionally used for producing this type of non-aqueous electrolyte secondary battery remains in the electrode and is brought into the battery, the battery performance may deteriorate. Further, the binder resin that is dispersed in such a solvent and bonds the particles of the electrode active material and also the electrode active material layer and the current collector can be a resistance component in a constructed electrode. Therefore, in order to reduce the resistance of the electrodes, it is preferable not to include the binder resin if possible. That is, while the solvent and the binder resin are necessary materials in the manufacturing process, the solvent and the binder resin can be unnecessary components after an electrode has been constructed, so it is preferable that the amount thereof be as small as possible (in other words, that the solvent and the binder resin be substantially not included). Therefore, a moisture powder (electrode material) including substantially no binder resin or solvent is required as an electrode material for constructing the electrode.

The present disclosure has been created in view of such circumstances, and a main object thereof is to provide a moisture powder capable of suppressing deterioration of battery performance and improving electrode density. Another object is to provide a method for manufacturing a battery including an electrode composed of such a moisture powder.

The moisture powder disclosed herein is provided to achieve the above object. The moisture powder disclosed herein is for forming an electrode active material layer on any of positive and negative electrode current collectors, the moisture powder being configured of aggregated particles including an electrode active material and a non-aqueous electrolytic solution, wherein a solid content ratio is 70% by mass or more when the total amount of the moisture powder is 100% by mass. The non-aqueous electrolytic solution includes a non-aqueous solvent and a support salt, and the viscosity of the non-aqueous electrolytic solution at 25° C. is 25 mPa·S or more and 130 mPa·S or less.

The non-aqueous electrolytic solution does not have an adverse effect on the battery performance, and by adjusting the non-aqueous electrolytic solution to a high viscosity and using it as a liquid component, it is possible to provide a moisture powder bonded by a liquid crosslinking force even when a binder resin which can be a resistance component and a solvent which can adversely affect the battery performance are substantially not included. With such a configuration, it is possible to realize a moisture powder capable of suppressing deterioration of battery performance and improving electrode density.

In a preferred embodiment of the moisture powder disclosed herein, the aggregated particle is characterized in that a solid phase and a liquid phase form a capillary state.

As a result of the solid phase and the liquid phase forming a capillary state, which will be described hereinbelow, in the aggregated particles constituting the moisture powder, it is possible to provide a moisture powder capable of more suitably forming an electrode.

In a preferred embodiment of the moisture powder disclosed herein, the non-aqueous solvent includes at least one selected from the group consisting of ethers, carbonates, glymes, esters, carbamates, amides, sulfides, sulfoxides, sulfones, and ketones, and the viscosity of the non-aqueous solvent at 25° C. is 0.6 mPa·S or more and 4.1 mPa·S or less. Further, in another preferred embodiment, the non-aqueous solvent includes at least the carbonate and the glyme, and when the non-aqueous solvent is 100% by volume, the glyme is contained in an amount of 30% by volume or more.

With the non-aqueous solvent having such a configuration, the viscosity of the non-aqueous electrolytic solution that can be contained as a liquid component in the moisture powder can be suitably adjusted, and the liquid crosslinking force in the moisture powder can be adequately controlled.

In a preferred embodiment of the moisture powder disclosed herein, the concentration of the support salt in the non-aqueous electrolytic solution is 2 mol/L or more and 5 mol/L or less.

With such a configuration, the viscosity of the non-aqueous electrolytic solution contained in the moisture powder can be suitably adjusted.

In order to solve the above other problems, the method for manufacturing a non-aqueous electrolyte secondary battery disclosed herein is provided. The manufacturing method disclosed herein is for manufacturing a non-aqueous electrolyte secondary battery including an electrode body having a positive electrode and a negative electrode and a non-aqueous electrolytic solution including a non-aqueous solvent and a support salt, the manufacturing method comprising: a step of granulating a moisture powder formed by aggregated particles including at least an electrode active material and the non-aqueous electrolytic solution, a step of supplying an electrode active material layer composed of the moisture powder onto an electrode current collector to form an electrode, a step of accommodating an electrode body produced by using the electrode in a battery case, and a step of injecting the non-aqueous solvent into the battery case where the electrode body is accommodated. Here, the method for manufacturing a non-aqueous electrolyte secondary battery is characterized in that the viscosity of the non-aqueous electrolytic solution at 25° C. in the granulation step is adjusted to 25 mPa·S or more and 130 mPa·S or less.

With such a configuration, since a solvent that may adversely affect the battery performance is substantially not included, it is possible to manufacture a battery having an improved electrode density without providing a process or equipment for removing the solvent. Further, since the non-aqueous electrolytic solution including the support salt in advance in the granulation step can be included in the electrode, it is sufficient to inject only the non-aqueous solvent in the non-aqueous solvent injection step in an amount smaller than in the conventional process. This shortens the time of the injection step and improves the storage stability of the non-aqueous solvent because the solvent does not contain a support salt. That is, a secondary battery provided with electrodes having improved battery performance, as described above, can be manufactured at a low production cost.

In a preferred embodiment of the production method disclosed herein, the concentration of the support salt in the non-aqueous electrolytic solution in the granulation step is 2 mol/L or more and 5 mol/L or less.

With such a configuration, the viscosity of the non-aqueous electrolytic solution in the granulation step can be suitably adjusted.

In a preferred embodiment of the manufacturing method disclosed herein, in the electrode formation step, the electrode is formed by adhering the moisture powder supplied between a first roll and a second roll disposed opposite to the first roll as the electrode active material layer onto the outer peripheral surface of the second roll, and transferring the electrode active material layer from the outer peripheral surface of the second roll to the surface of the electrode current collector separately supplied to the second roll.

With such a configuration, the moisture powder granulated in the granulation step can be suitably transferred onto the electrode current collector.

BRIEF DESCRIPTION OF THE DRAWINGS

FIGS. 2A to 2D are explanatory drawings schematically showing the presence forms of a solid phase (solid components such as active material particles), a liquid phase (solvent), and a gas phase (voids) in the aggregated particles constituting the moisture powder.

DETAILED DESCRIPTION

Hereinafter, a moisture powder and a method for manufacturing a battery including an electrode composed of the moisture powder, which are disclosed herein, will be described in detail by taking an electrode that can be suitably used for a lithium ion secondary battery, which is a typical example of a secondary battery, as an example.

Matters other than those specifically mentioned in this specification and necessary for implementation can be ascertained as design matters for those skilled in the art based on the related art in the pertinent field. The contents of the technique disclosed herein can be implemented based on the contents disclosed in the present description and common technical knowledge in the art.

Also, the dimensional relationship (length, width, height, and the like) does not reflect the actual dimensional relationship.

In this description, the notation of "A to B (where, A and B are arbitrary values)" indicating the range means A or more and B or less.

As used herein, the term "secondary battery" refers to a battery that can be recharged repeatedly. Further, the term "non-aqueous electrolyte secondary battery" refers to a battery provided with a non-aqueous electrolytic solution (typically, a non-aqueous electrolytic solution including a support electrolyte in a non-aqueous solvent). The term "lithium ion secondary battery" refers to a secondary battery that uses lithium ions as a charge carrier and realizes charge/discharge by the transfer of charges by the lithium ions between the positive and negative electrodes. Further, in the present description, when it is not necessary to particularly distinguish between the positive electrode and the negative electrode, it is simply described as an electrode.

The moisture powder disclosed herein is typically configured of aggregated particles including an electrode active material and a non-aqueous electrolytic solution. The solid content ratio is typically 70% by mass or more when the total amount of the moisture powder is 100% by mass. For example, the solid content ratio may be 70% by mass or more and 87% by mass or less, or 72% by mass or more and 85% by mass or less. In the moisture powder disclosed herein, the solid content ratio is set to a relatively high value as compared with the conventional slurry-like compositions. By setting the solid content ratio within the above range, a capillary state described hereinbelow is suitably formed in the aggregated particles, and the electrode active material can be suitably integrated by a liquid crosslinking force (a sum of capillary negative pressure and surface tension) even when the binder resin and the solvent are substantially not included.

In the present description, the "solid content ratio" means the proportion of solid components in the entire moisture powder.

The moisture powder described herein is in the form of powder as a whole and has no free liquid surface at the gas-liquid interface. As a material exhibiting such properties, for example, it is preferable that the aggregated particles constituting the moisture powder form a capillary state described hereinbelow.

The morphological classification of such moisture powders is described in "Particle Size Enlargement" by Capes C. E. (Elsevier Scientific Publishing Company, 1980), the four currently known classifications are used in the present description, and the moisture powder disclosed herein is clearly defined. Specifically, as described hereinbelow.

Generally, the presence form (filling state) of a solid phase (solid component such as an electrode active material), a liquid phase (liquid component such as a non-aqueous electrolytic solution) and a gas phase (voids) in an aggregated particle can be classified into four following states: "pendular state", "funicular state", "capillary state", and "slurry state".

Figure 2:
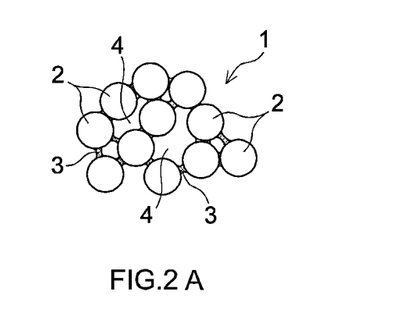
FIG. 2A shows a pendular state.
FIG. 2B shows a funicular state.
FIG. 2C shows a capillary state.
FIG. 2D shows a slurry state.

In the "pendular state", as shown in FIG. 2A, a liquid component (liquid phase) 3 is discontinuously present so as to crosslink between the solid components (solid phases) 2 in the aggregated particle 1, and the solid components 2 can be present in a connected (continuous) state with each other. As shown in the figure, the content ratio of the liquid component 3 is relatively low, and as a result, most of the voids (gas phase) 4 present in the aggregated particle 1 are present continuously and form communication holes leading to the outside.

In the "funicular state", as shown in FIG. 2B, the content ratio of the liquid component 3 in the aggregated particle 1 is relatively higher than in the pendular state, and the liquid component 3 is continuously present around the solid components 2 in the aggregated particle 1. However, since the amount of the liquid component 3 is still small, the solid components 2 are present a state of being connected (continuous) to each other as in the pendular state. Among the voids 4 present in the aggregated particle 1, the proportion of the communicating holes leading to the outside tends to decrease slightly, and the presence proportion of the discontinuous isolated voids tends to increase, but the presence of the communicating holes is recognized.

In the "capillary state", as shown in FIG. 2C, the content ratio of the liquid component 3 in the aggregated particle 1 increases, the amount of the liquid component 3 in the aggregated particle 1 becomes close to the saturated state, and a sufficient amount of the liquid component 3 is continuously present around the solid components 2. As a result, the solid components 2 are present in a discontinuous state. The space between the solid components is filled with the liquid component 3, and the bonding force between the solid components is strong. The liquid component 3 stays on the surface of the aggregated particle 1, and the surface of the aggregated particle 1 is in a moist state and can exhibit viscosity. Due to the increase in the content of the liquid component 3 in the aggregated particle 1, almost no voids are present, and when voids are present, almost all voids (for example, 80% by volume or more of the total void volume) are present as isolated voids.

In the "slurry state", as shown in FIG. 2D, the solid components 2 are suspended in the liquid component 3, and the formation cannot be called an aggregated particle. The presence ratio of the gas phase is further smaller than in the capillary state.

As the electrode active material which is the main component of the solid component 2, a compound having a composition that can be utilized as a negative electrode active material or a positive electrode active material of a conventional secondary battery (here, a lithium ion secondary battery) can be used. Examples of the negative electrode active material include carbon materials such as graphite, hard carbon, soft carbon, and the like. Further, other examples of the negative electrode active material include metal materials consisting of a metal such as tin (Sn), aluminum (Al), zinc (Zn), silicon (Si), or the like or an alloy mainly composed of these metals (so-called alloy system), or the like. Examples of the positive electrode active material include lithium transition metal composite oxides such as $LiNi_{1/3}Co_{1/3}Mn_{1/3}O_2$, $LiNiO_2$, $LiCoO_2$, $LiFeO_2$, $LiMn_2O_4$, $LiNi_{0.5}Mn_{1.5}O_4$, and the like and lithium transition metal phosphate compounds such as $LiFePO_4$ and the like. The average particle diameter of the electrode active material is not particularly limited, but is suitably about 0.1 μm to 50 μm, and preferably about 1 μm to 20 μm.

In the present description, the "average particle diameter" refers to a particle diameter ($D_{50}$, also referred to as a median diameter) corresponding to a cumulative frequency of 50% by volume from the fine particle side having a small particle diameter in a volume-based particle size distribution determined based on a general laser diffraction/light scattering method.

Examples of the other solid components 2 include a conductive material and the like. As the conductive material, for example, carbon black such as acetylene black (AB) and the like or other carbon materials (graphite or the like) can be suitably used.

The moisture powder disclosed herein includes substantially no binder resin conventionally used in this type of electrode manufacturing method. The binder resin referred to herein is a binder that has a binding effect but does not have conductivity, and examples thereof include rubbers such as a styrene-butadiene copolymer (SBR), an acrylic acid-modified SBR resin (SBR-based latex) and the like, cellulous polymers such as carboxymethyl cellulose (CMC) and the like, acrylic resins such as polymers of methacrylic acid esters and the like, polyvinylidene fluoride (PVdF), and the like. Such a binder resin has been an essential component conventionally used as a binder for binding active material particles to each other or between the electrode material and an electrode current collector in this type of electrode material. However, since the binder resin can generally be a resistance component in a constructed electrode, it is preferable that the amount of the binder resin be as small as possible (in other words, that the binder resin be substantially not included). As a result of including substantially no binder resin, the density of the electrode active material (electrode density) can be improved.

In this description, "substantially not included" means that the target component is not intentionally added, and the component is not contained at all, or that the target component is contained only in a very small amount (so-called contamination level) that has no meaning in the manufacturing method disclosed herein.

Further, the moisture powder disclosed herein includes substantially no solvent conventionally used in this type of electrode manufacturing method. The solvent referred to herein is a liquid component that may adversely affect the battery performance in a constructed secondary battery, and examples thereof include N-methyl-2-pyrrolidone (NMP), aqueous solvents (water or a mixed solvent mainly composed of water), and the like. Such a solvent has been used as an essential component in the conventional manufacturing method for the purpose of suitably dispersing an active material, a conductive material, or the like. However, where the solvent remains in a constructed electrode, the battery performance is adversely affected, so it is necessary to remove the solvent by drying or the like. Meanwhile, in the moisture powder disclosed herein, a non-aqueous electrolytic solution that includes substantially no conventional solvent and does not adversely affect the performance of the constructed secondary battery is used. Therefore, it is possible to provide a moisture powder suitable for constructing a secondary battery of higher quality.

As the non-aqueous electrolytic solution contained in the moisture powder, typically, a solution in which a support electrolyte (also referred to as a support salt) is contained in a non-aqueous solvent can be used. The non-aqueous electrolytic solution is required to have a higher viscosity than the conventional one. Specifically, the non-aqueous electrolytic solution has a viscosity (shear viscosity) at 25° C. of 25 mPa·S or more. The viscosity of the non-aqueous electrolytic solution may be 25 mPa·S or more and 130 mPa·S or less, and may be 50 mPa·S or more and 122 mPa·S or less. With such a configuration, the liquid crosslinking force is suitably exhibited between the solid components, and the electrode active material layer having an improved electrode density can be formed.

Here, the viscosity means a shear viscosity (mPa·s) and can be easily measured with a commercially available rotational viscometer (for example, a well-known B-type viscometer manufactured by Brookfield Co.).

Examples of the types of non-aqueous solvent include ethers, carbonates, esters, carbamates, amides, sulfides, sulfoxides, sulfones, ketones, glymes, and the like. Among them, carbonates and/or glymes are preferably used because a high-viscosity non-aqueous electrolytic solution can be easily prepared. Specific examples include ethylene carbonate (EC), propylene carbonate (PC), ethylmethyl carbonate (EMC), dimethyl carbonate (DMC), diethyl carbonate (DEC), monofluoroethylene carbonate (MFEC), difluoroethylene carbonate (DFEC), monofluoromethyldifluoromethyl carbonate (F-DMC), trifluorodimethyl carbonate (TFDMC), triglyme (G3), tetraglyme (G4), and the like. As such a non-aqueous solvent, one kind may be used alone, or two or more kinds may be used in combination as appropriate.

Glyme is a general term for a linear glycol diether. Triglyme (triethylene glycol dimethyl ether) means an ether compound represented by the structural formula of $CH_3(OCH_2CH_2)_3OCH_3$. Further, tetraglyme (tetraethylene glycol dimethyl ether) means an ether compound represented by the structural formula of $CH_3(OCH_2CH_2)_4OCH_3$.

In one preferred embodiment, the viscosity of the non-aqueous solvent at 25° C. is 0.6 mPa·S or more and 4.1 mPa·S or less, and 0.6 mPa·S or more and 3.8 mPa·S or less. The viscosity may be adjusted to the above-mentioned suitable viscosity range by using one kind of the above-mentioned non-aqueous solvents having a suitable viscosity alone or by appropriately combining two or more kinds. When two or more kinds are combined, it is preferable that the glyme is contained in an amount of 30% by volume or more (for example, 30% by volume to 50% by volume) when the total amount of the non-aqueous solvent is 100% by volume.

As the support salt contained in the non-aqueous solvent, the support salt used in the conventional non-aqueous electrolyte secondary battery of this type can be used without particular limitation. For example, lithium salts such as $LiPF_6$, $LiBF_4$, $LiAsF_6$, $LiCF_3SO_3$, $LiC_4F_9SO_3$, $LiN(CF_3SO_2)_2$, $LiC(CF_3SO_2)_3$, and the like can be used.

The concentration of the support salt in the non-aqueous electrolytic solution may be adjusted so that the viscosity of the non-aqueous electrolytic solution is within the above-mentioned range. In general, the viscosity of the non-aqueous electrolytic solution can be increased by increasing the concentration of the support salt in the non-aqueous electrolytic solution. The concentration of the support salt in the non-aqueous electrolytic solution varies depending on the non-aqueous solvent used and, therefore, is not particularly limited, but for example, it is preferably 2 mol/L or more and 5 mol/L or less, more preferably 2 mol/L or more and 4.5 mol/L or less, and particularly preferably 2.5 mol/L or more and 4.1 mol/L or less.

The concentration of the support salt of the non-aqueous electrolytic solution used in the conventional non-aqueous electrolyte secondary battery is typically about 1 mol/L. In the non-aqueous solvent injection step described hereinbelow, it is possible to inject a non-aqueous solvent and adjust the concentration of the support salt to be about 1 mol/L (for example, 0.7 mol/L or more and 1.3 mol/L or less). Therefore, the concentration of the support salt in the non-aqueous electrolytic solution in the moisture powder (electrode material) may be higher than in the conventional case. By setting the concentration of the support salt high, the viscosity of the non-aqueous electrolytic solution becomes high, and moldability in the electrode formation step described hereinbelow is improved.

The non-aqueous electrolytic solution of the non-aqueous secondary battery according to the present embodiment may include various additives, for example, a gas generator such as biphenyl (BP), cyclohexylbenzene (CHB), or the like, a film forming agent, a dispersant a thickener, or the like as long as the effect of the present disclosure is not significantly impaired.

Method for manufacturing non-aqueous electrolyte secondary battery

Figure 1:
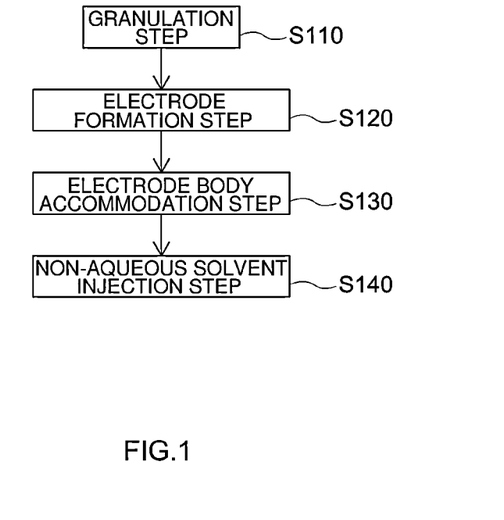
FIG. 1 is a flowchart showing main steps of an electrode manufacturing method according to an embodiment.

FIG. 1 is a flow chart showing a method for manufacturing an electrode disclosed herein. The electrode manufacturing method disclosed herein typically includes the following four steps: (1) a step of granulating a moisture powder (S110); (2) a step of forming an electrode (S120); (3) a step of accommodating an electrode body produced from the electrode in a battery case (S130); (4) a step of injecting a non-aqueous solvent (S140). Hereinafter, each step will be described in detail.

Granulation Step

In the granulation step S110, an electrode active material and a non-aqueous electrolytic solution are mixed and then granulated to granulate an electrode material (moisture powder) in a wet state. The mixing method is not particularly limited, and for example, a mixer such as a planetary mixer or the like may be used for mixing. Examples of methods for producing granulated particles include a rolling granulation method, a fluidized bed granulation method, a stirring granulation method, a compression granulation method, an extrusion granulation method, a crushing granulation method, a spray-drying method, and the like. Among them, the compression granulation method is preferable because the moisture powder disclosed herein can be suitably granulated.

First, the electrode active material and the non-aqueous electrolytic solution are mixed using a mixer such as a planetary mixer or the like. Such a mixer is typically provided with a cylindrical mixing vessel, a rotary vane accommodated inside the mixing vessel, and a motor connected to the rotary vane by a rotary shaft. The electrode active material and the non-aqueous electrolytic solution are put into the mixing vessel of the mixer and rotated, for example, at a rotation speed of 2000 rpm to 5000 rpm for about 1 sec to 30 sec to manufacture a mixture of the electrode active material and the non-aqueous electrolytic solution. The non-aqueous electrolytic solution is weighed and charged so that the solid content ratio of the moisture powder is 70% by mass or more, more preferably 75% by mass or more (for example, 80% by mass to 87% by mass). Then, a conductive material is added into the mixing vessel, and the rotary blade is further rotated at a rotation speed of, for example, 100 rpm to 1000 rpm for about 1 sec to 30 sec. This makes it possible to obtain a wet mixture in which the materials are sufficiently mixed.

Next, the mixture is granulated while being compressed using a conventional known granulator. For example, a preferred embodiment of such a granulator is a roll mill that granulates while compressing a mixture put between a pair of rolls that rotate in opposite directions. In compression granulation by a roll mill, granulation is performed while applying a high compressive force and a shearing force to the charged mixture. Although not particularly limited, it is presumed that the following granulation is performed by such a granulation method to suitably form a moisture powder in a capillary state.

The moisture powder disclosed herein includes a high-viscosity non-aqueous electrolytic solution. The high-viscosity non-aqueous electrolytic solution is in a state of being suitably adhered to the surface of a solid material (here, the electrode active material) by the abovementioned mixing. When the particles of the electrode active material are rubbed against each other while being compressed in such a state, gas is pushed out from the mixture, and the particles of the electrode active materials can be in a state with a higher density. That is, the aggregated particles 1 in the capillary state as shown in FIG. 2C can be suitably formed. The particles of the electrode active material may be in a state of being relatively strongly bonded to each other by a liquid crosslinking force. Further, by using a high-viscosity non-aqueous electrolytic solution, the binding force of the aggregated particle 1 can be further improved. As a result, the moisture powder can be granulated even when no binder resin that can be a resistance component is included.

As for the properties of the moisture powder granulated in the granulation step, for example, the average particle diameter may be approximately 10 μm or more, 100 μm or more, or 1 mm or more. The upper limit of the average particle diameter is not particularly limited, but is typically 10 mm or less, and may be, for example, 5 mm or less.

Electrode Formation Step

Figure 3:
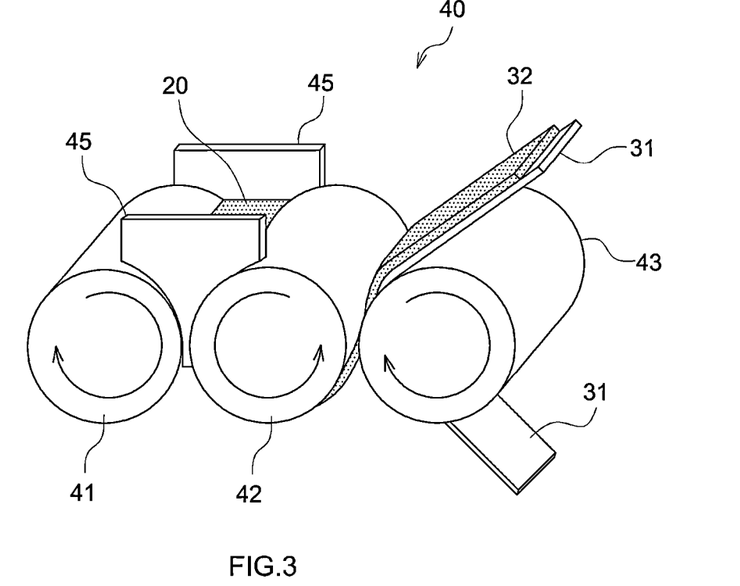
FIG. 3 is an explanatory diagram schematically showing a configuration of a roll film forming apparatus according to an embodiment.

The electrode formation step S120 is a step of supplying an electrode active material layer composed of the moisture powder onto an electrode current collector to form an electrode. An electrode active material layer 32 composed of the moisture powder 20 can be formed by using a roll film forming apparatus 40 such as schematically shown in FIG. 3. As shown in the figure, the roll film forming apparatus 40 is provided with a first rotating roll 41 (hereinafter, also referred to as "supply roll 41") and a second rotating roll 42 (hereinafter, also referred to as a "transfer roll 42") arranged so as to face the first rotating roll 41. The outer peripheral surface of the supply roll 41 and the outer peripheral surface of the transfer roll 42 face each other, and the pair of rotating rolls 41 and 42 can rotate in opposite directions as shown by the arrows in FIG. 3. Further, the supply roll 41 and the transfer roll 42 are separated from each other by a gap corresponding to a desired thickness of the electrode active material layer 32 to be formed on a long sheet-shaped electrode current collector 31. In addition, by adjusting the size of the gap, it is also possible to adjust the force for compressing the moisture powder 20 passing between the supply roll 41 and the transfer roll 42. Therefore, by adjusting the size of the gap between the supply roll 41 and the transfer roll 42 according to the solid content ratio or the like of the moisture powder 20, the granulated particles are suitably integrated with each other and stretched to mold a film.

As the electrode current collector 31, a metal electrode current collector used as an electrode current collector of this type of secondary battery can be used without particular limitation. When the electrode current collector 31 is a positive electrode current collector, it is configured of, for example, a metal material such as aluminum, nickel, titanium, stainless steel, or the like having good conductivity. In particular, aluminum (for example, aluminum foil) is preferable. When the electrode current collector 31 is a negative electrode current collector, it is configured of, for example, a metal material such as copper, an alloy mainly composed of copper, nickel, titanium, stainless steel, or the like having good conductivity. In particular, copper (for example, copper foil) is preferable. The thickness of the electrode current collector 31 is, for example, approximately 5 μm to 20 μm, and preferably 8 μm to 15 μm.

Partition walls 45 are provided at both ends of the supply roll 41 and the transfer roll 42 in the width direction. The partition walls 45 serve to hold the moisture powder 20 on the supply roll 41 and the transfer roll 42 and to define the width of the electrode active material layer 32 formed on the electrode current collector 31 by the distance between the two partition walls 45. An electrode material (moisture powder 20) is supplied between the two partition walls 45 by a feeder (not shown) or the like.

In the roll film forming apparatus 40 according to the present embodiment, a backup roll 43 is arranged as a third rotating roll next to the transfer roll 42. The backup roll 43 serves to convey the electrode current collector 31 to the transfer roll 42. The transfer roll 42 and the backup roll 43 rotate in opposite directions as shown by the arrows in FIG. 3.

The supply roll 41, the transfer roll 42, and the backup roll 43 are connected to respective mutually independent drive devices (motors) (not shown), and the rotation speeds of the supply roll 41, the transfer roll 42, and the backup roll 43 are gradually increased in this order thereby making it possible to convey the moisture powder 20 along the transfer roll 42, and to transfer the moisture powder as the electrode active material layer 32 from the outer peripheral surface of the transfer roll 42 onto the surface of the electrode current collector 31 conveyed by the backup roll 43.

Although not particularly limited, the size (width) of each gap between the supply roll 41, the transfer roll 42, and the backup roll 43 may be set so that the average film thickness of the electrode active material layer 32 at the time of film formation is 10 μm or more and 300 μm or less (for example, 20 μm or more and 150 μm or less).

The sizes of the supply roll 41, the transfer roll 42, and the backup roll 43 are not particularly limited and may be the same as those of the conventional roll film forming apparatus, for example, each roll may have a diameter of 50 mm to 500 mm. The diameters of the supply roll 41, the transfer roll 42, and the backup roll 43 may be the same or different. Further, the width for forming the electrode active material layer 32 may be the same as that of the conventional roll film forming apparatus, and can be determined, as appropriate, depending on the width of the electrode current collector 31 on which the electrode active material layer 32 is to be formed. The material of the outer peripheral surfaces of the supply roll 41, the transfer roll 42, and the backup roll 43 may be the same as the material of the rotating rolls in the conventional known roll film forming apparatus, and examples thereof include SUS steel and SUJ steel.

In FIG. 3, the supply roll 41, the transfer roll 42, and the backup roll 43 are arranged so that the respective rotation axes thereof are arranged horizontally, but this arrangement of the rolls is not limiting.

In the electrode formation step S120 disclosed herein, first, the moisture powder 20 is supplied between the pair of supply rolls 41 and the transfer rolls 42 that rotate in the opposite directions. The moisture powder 20 is carried into the gap between the pair of rolls by rotating the supply roll 41 and the transfer roll 42 in the opposite directions. Then, the moisture powder 20 passes, while being compressed, through the gap between the supply roll 41 and the transfer roll 42 and is formed into a film to form the electrode active material layer 32. That is, the moisture powder 20 is compressed by the supply roll 41 and the transfer roll 42, so that the particles of the moisture powder 20 are integrated with each other and stretched to form a film-shaped electrode active material layer 32. At this time, the particles of the moisture powder 20 (specifically, the aggregated particles) are not particularly limited, but it is presumed that the particles are bonded by the liquid crosslinking force. Examples of the adhesive force (bonding force) between the particles include a van der Waals force, an electrostatic force, and the like in addition to the liquid crosslinking force. The liquid crosslinking force ensures a relatively large adhesive force and ensures a suitable adhesive force even when the solid content ratio is, for example, 70% by mass or more (for example, 70% by mass to 87% by mass). In addition to this, the binding force is strengthened by using a high-viscosity non-aqueous electrolytic solution. Therefore, by compressing the moisture powder 20 in the capillary state described above, the film-shaped electrode active material layer 32 can be formed even if the binder resin is substantially not included.

Next, the electrode active material layer 32 is adhered to the transfer roll 42 and conveyed. As described above, since the rotation speed of the transfer roll 42 is set to be higher than that of the supply roll 41, the formed electrode active material layer 32 adheres to the transfer roll 42. The electrode active material layer 32 adhered to the transfer roll 42 is conveyed by the rotation of the transfer roll 42 and transferred onto the electrode current collector 31 supplied by the backup roll 43. At this time, when the electrode active material layer 32 comes into contact with the electrode current collector 31 under a certain pressure, the electrode active material layer 32 is transferred onto the electrode current collector 31. As a result, an electrode in which the electrode active material layer 32 is provided on the electrode current collector 31 can be obtained.

The electrode active material layer composed of a general slurry-shaped electrode material is formed by applying an electrode material prepared in a slurry form with an electrode active material and a binder in a suitable solvent to a current collector, drying, and then pressing. According to this method, migration, which is a phenomenon in which a binder having a small specific gravity segregates toward the surface side, occurs when the slurry-like electrode material coated on the current collector is dried. When such migration occurs, the adhesion between the electrode current collector and the electrode active material layer may decrease. The electrode active material layer is likely to peel off from the electrode current collector during the manufacturing process of the non-aqueous electrolyte secondary battery or during repeated charging and discharging when the non-aqueous electrolyte secondary battery is used. Another problem is that the slurry-shaped electrode material has a low solid content ratio (typically 55% or less), and it takes time to remove the solvent by drying or the like, so that that the productivity is lowered. Meanwhile, in the electrode manufacturing method disclosed herein, since a non-aqueous electrolytic solution is used as the liquid component, it is not necessary to remove the liquid component. As a result, the migration does not occur, and a high-quality electrode in which the electrode active material layer does not peel off from the electrode current collector can be manufactured. Further, for the above-mentioned reason, the solvent removal step and the solvent recovery device are unnecessary, and the improvement in productivity is also realized. In addition to this, a moisture powder that includes substantially no binder resin that can be a resistance component is used, and the film is formed while being compressed by the roll film forming apparatus, so that the electrode density can be sufficiently increased. This eliminates a pressing step (step of adjusting the density of the electrode active material layer) present in the conventional manufacturing method. Therefore, according to the electrode manufacturing method disclosed herein, an electrode of higher quality than the conventional ones can be efficiently manufactured.

Electrode Body Accommodation Step

In the electrode body accommodation step S130, an electrode body is produced using the sheet-shaped electrode manufactured above, and the electrode body is accommodated in a battery case. As a method for producing an electrode body, specifically, a sheet-shaped positive electrode and a sheet-shaped negative electrode are laminated with a sheet-shaped separator interposed therebetween to produce the electrode body.

Examples of the separator include a porous sheet (film) composed of a resin such as polyethylene (PE), polypropylene (PP), a polyester, cellulose, a polyamide, and the like. The porous sheet may have a single-layer structure or a laminated structure of two or more layers (for example, a three-layer structure in which PP layers are laminated on both sides of the PE layer). The separator may be provided with a heat resistant layer (HRL).

The sheet-shaped electrode may be used as it is or may be used after being cut into a rectangular flat plate. For example, a wound electrode body can be produced by winding sheet-shaped positive electrode and negative electrode in a state of being laminated with a separator interposed therebetween in the longitudinal direction. Further, for example, a laminated electrode body can be produced by laminating a positive electrode and a negative electrode cut into a rectangular flat plate shape with a separator interposed therebetween.

The electrode body is accommodated in a battery case. The battery case may be a box-shaped battery case configured of a metal material having high strength, light weight, and good thermal conductivity, and typically may be a laminated case configured of a laminated film having a multi-layer structure.

Non-Aqueous Solvent Injection Step

In the non-aqueous solvent injection step S140, a predetermined non-aqueous solvent is injected into the battery case in which the electrode body has been accommodated. As the non-aqueous solvent injected in this step, a non-aqueous solvent contained in the non-aqueous solvent of the non-aqueous electrolytic solution used in the granulation step S110 may be typically used. In the manufacturing method disclosed herein, it is not necessary to carry out the step of removing a liquid component, so that the liquid component (non-aqueous electrolytic solution) added in the granulation step S110 generally remains in the electrode body. Therefore, the non-aqueous solvent injected in the non-aqueous solvent injection step S140 can be mixed with the non-aqueous electrolytic solution remaining in the electrode body.

The non-aqueous electrolytic solution injected in the conventional manufacturing method typically includes a non-aqueous solvent and a support salt. The non-aqueous electrolytic solution used in the granulation step S110 disclosed herein is preferably set to have a high support salt concentration in the non-aqueous electrolytic solution in order to obtain a high viscosity as described above. For example, by charging a support salt in advance into the non-aqueous electrolytic solution to be used in the granulation step S110 so that the concentration of the support salt in the non-aqueous electrolytic solution when constructing the secondary battery is about 1 mol/L, it is possible to inject only the non-aqueous solvent in the non-aqueous solvent injection step S140. The non-aqueous solvent may be injected so that the concentration of the support salt in the non-aqueous electrolytic solution when constructing the secondary battery is, for example, 0.7 mol/L or more and 1.3 mol/L or less.

The support salt is used as a main electrolyte and is a necessary component because it can appropriately balance the total ion content in the non-aqueous electrolytic solution and the viscosity of the electrolytic solution. Meanwhile, from the viewpoint of extending the storage period of the non-aqueous electrolytic solution, it is preferable that the non-aqueous solvent and the support salt be prepared in a non-mixed state. Further, since the support salt is not contained at the injection stage, a liquid (non-aqueous solvent) having a lower viscosity than the conventional non-aqueous electrolytic solution can be injected, so that the injection time is shortened. In addition to this, since the electrode is impregnated with a sufficient amount of non-aqueous electrolytic solution, there is no need for a waiting time for the electrode body to be impregnated with the non-aqueous solvent, which also can shorten the time of the non-aqueous solvent injection step S140. Therefore, according to the manufacturing method disclosed herein, a non-aqueous electrolyte secondary battery can be manufactured by a manufacturing method in which a solvent that may adversely affect the battery performance is not included and the production cost is reduced.

Lithium-Ion Secondary Battery

Figure 4:
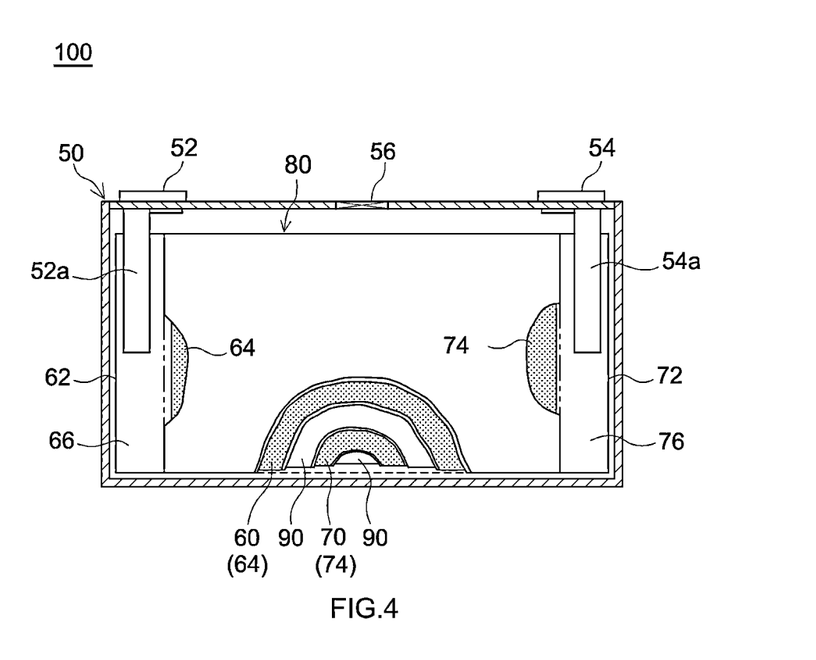
FIG. 4 is an explanatory diagram schematically showing a lithium ion secondary battery according to an embodiment.

Hereinafter, a lithium ion secondary battery 100 that can be constructed by the method for manufacturing a battery disclosed herein will be described. FIG. 4 is an explanatory diagram schematically showing an example of the lithium ion secondary battery 100.

The lithium ion secondary battery 100 shown in FIG. 4 is constructed by accommodating a flat wound electrode body 80 and a non-aqueous electrolytic solution (not shown) in a hermetically sealed box-shaped battery case 50. The battery case 50 is provided with a positive electrode terminal 52 and a negative electrode terminal 54 for external connection and a thin-walled safety valve 56 set to release an internal pressure when the internal pressure of the battery case 50 rises to or above a predetermined level. Further, the battery case 50 is provided with an injection port (not shown) for injecting a non-aqueous electrolytic solution or a non-aqueous solvent. The positive electrode terminal 52 and a positive electrode current collector plate 52a are electrically connected to each other. The negative electrode terminal 54 and a negative electrode current collector plate 54a are electrically connected to each other.

The wound electrode body 80 typically has a shape obtained by laminating a long sheet-shaped positive electrode (hereinafter referred to as a positive electrode sheet 60) and a long sheet-shaped negative electrode (hereinafter referred to as a negative electrode sheet 70) with a long sheet-shaped separator 90 interposed therebetween, and winding the laminate in the longitudinal direction. The positive electrode sheet 60 has a configuration in which a positive electrode active material layer 64 is formed along the longitudinal direction on one side or both sides of a positive electrode current collector 62. The negative electrode sheet 70 has a structure in which a negative electrode active material layer 74 is formed along the longitudinal direction on one side or both sides of a negative electrode current collector 72. On the edge of the positive electrode current collector 62 on one side in the width direction, a region where the positive electrode active material layer 64 is not formed along the edge and the positive electrode current collector 62 is exposed (that is, a positive electrode active material layer non-formation portion 66) is provided. On the edge portion of the negative electrode current collector 72 on the other side in the width direction, a region where the negative electrode active material layer 74 is not formed along the edge and the negative electrode current collector 72 is exposed (that is, the negative electrode active material layer non-formation portion 76) is provided. The positive electrode current collector plate 52a and the negative electrode current collector plate 54a are joined to the positive electrode active material layer non-formation portion 66 and the negative electrode active material layer non-formation portion 76, respectively.

As the positive electrode (positive electrode sheet 60) and the negative electrode (negative electrode sheet 70), the positive electrode and the negative electrode obtained by the above-mentioned manufacturing method are used. In the positive electrode and negative electrode of this configuration example, the electrode active material layer 32 (positive electrode active material layer 64 and the negative electrode active material layer 74) is formed on both sides of the electrode current collector 31 (positive electrode current collector 62 and the negative electrode current collector 72).

The lithium ion secondary battery 100 configured as described above can be used for various purposes. Suitable applications include drive power supplies mounted on vehicles such as battery electric vehicles (BEVs), hybrid electric vehicles (HEVs), and plug-in hybrid electric vehicles (PHEVs). The lithium ion secondary battery 100 may also be used in the form of a battery pack in which in which a plurality of the batteries are connected in series and/or in parallel.

Hereinafter, examples relating to the electrodes disclosed herein will be described, but the techniques disclosed herein are not intended to be limited to those shown in such examples.

Example 1

Using the positive electrode material shown hereinbelow, a non-aqueous electrolyte secondary battery was produced according to the flow shown in FIG. 1.

First, a lithium transition metal oxide ($LiNi_{1/3}Co_{1/3}Mn_{1/3}O_2$) having an average particle diameter ($D_{50}$) of 20 μm as determined based on a laser diffraction/scattering method was prepared as a positive electrode active material, and acetylene black was prepared as a conductive material. As a non-aqueous electrolytic solution, a solution obtained by dissolving $LiPF_6$ as a support salt at a concentration of 4.1 mol/L in a mixed solvent including tetraethylene glycol dimethyl ether (G4), dimethyl carbonate (DMC) and ethyl methyl carbonate (EMC) at volume ratios of 30:40:30 was prepared. The viscosity of the non-aqueous electrolytic solution at 25° C. was measured and found to be 122 mPa·s.

A total of 90 parts by mass of the positive electrode active material and 10 parts by mass of acetylene black were put into a planetary mixer and mixed to obtain a mixture of powder materials consisting of the solid materials. A non-aqueous electrolytic solution was added to the obtained mixture so that the solid content ratio was 70% by mass, and further mixing was performed. The wet mixture was granulated by a roll mill to prepare a moisture powder (positive electrode material) according to this example.

Next, the obtained moisture powder (positive electrode material) was supplied to the roll film forming apparatus, and a positive electrode active material layer was formed on the surface of a long sheet-shaped positive electrode current collector made of a separately prepared aluminum foil. As a result, a positive electrode sheet in which the positive electrode active material layer was formed on the sheet-shaped positive electrode current collector was obtained.

Next, as a negative electrode, graphite powder having an average particle diameter ($D_{50}$) of 10 μm as determined based on the laser diffraction/scattering method was prepared as a negative electrode active material. As a non-aqueous electrolytic solution, the one used for the positive electrode was prepared. The non-aqueous electrolytic solution was added to the graphite powder so that the solid content ratio was 70% by mass, followed by mixing. The wet mixture was granulated by a roll mill to prepare a moisture powder (negative electrode material).

The obtained moisture powder (negative electrode material) was supplied to the film forming apparatus, and a negative electrode active material layer was formed on the surface of a long sheet-shaped negative electrode current collector made of a separately prepared copper foil. As a result, a negative electrode sheet in which the negative electrode active material layer was formed on the sheet-shaped negative electrode current collector was obtained.

As the separator sheet, two porous polyolefin sheets having a three-layer structure of PP/PE/PP were prepared.

The produced positive electrode sheet and negative electrode sheet, and the two prepared separator sheets were laminated and wound to produce a wound electrode body.

Electrode terminals were attached to each of the positive electrode sheet and the negative electrode sheet of the produced wound electrode body by welding, and the resultant configuration was accommodated in a battery case having an injection port.

A non-aqueous solvent was injected from the injection port, and the injection port was hermetically sealed with a sealing lid. As the non-aqueous solvent, a mixed solvent with volume ratios of components of G4:DMC:EMC=30:40:30 was produced, and the solvent was injected so that the concentration of the support salt in the non-aqueous electrolytic solution of the constructed secondary battery was 1.0 mol/L. An evaluation lithium ion secondary battery was thus obtained.

Comparative Example 1

As a comparison object, an electrode was prepared using a non-aqueous electrolytic solution having the same viscosity as the conventional one.

First, the same positive electrode active material and conductive material as in Example 1 were prepared. A non-aqueous electrolytic solution was prepared by dissolving $LiPF_6$ as a support salt at a concentration of 1 mol/L in a mixed solvent including ethylene carbonate (EC), dimethyl carbonate (DMC) and ethyl methyl carbonate (EMC) at volume ratios of 30:40:30. The viscosity of the non-aqueous electrolytic solution at 25° C. was measured and found to be 3.1 mPa·s.

A total of 90 parts by mass of the positive electrode active material and 10 parts by mass of acetylene black were put into a planetary mixer and mixed to obtain a mixture of powder materials consisting of the solid materials. A non-aqueous electrolytic solution was added to the obtained mixture so that the solid content ratio was 70% by mass, and further mixing was performed. The wet mixture was granulated by a roll mill. A moisture powder (positive electrode material) was thus produced.

Next, the obtained moisture powder (positive electrode material) was supplied to the roll film forming apparatus, and a positive electrode active material layer was formed on the surface of a long sheet-shaped positive electrode current collector made of a separately prepared aluminum foil. As a result, a positive electrode sheet in which the positive electrode active material layer was formed on the sheet-shaped positive electrode current collector was obtained.

Next, as a negative electrode, graphite powder having an average particle diameter ($D_{50}$) of 10 μm as determined based on the laser diffraction/scattering method was prepared as a negative electrode active material. As a non-aqueous electrolytic solution, the one used for the positive electrode of Comparative Example 1 was prepared. The non-aqueous electrolytic solution was added to the graphite powder so that the solid content ratio was 70% by mass, followed by mixing. The wet mixture was granulated by a roll mill to prepare a moisture powder (negative electrode material).

Next, the obtained moisture powder (negative electrode material) was supplied to the film forming apparatus, and a negative electrode active material layer was formed on the surface of a long sheet-shaped negative electrode current collector made of a separately prepared copper foil. As a result, a negative electrode sheet in which the negative electrode active material layer was formed on the sheet-shaped negative electrode current collector was obtained.

Further, as a separator sheet, two porous polyolefin sheets having a three-layer structure of PP/PE/PP were prepared.

The produced positive electrode sheet and negative electrode sheet, and the two prepared separator sheets were laminated and wound to produce a wound electrode body. Electrode terminals were attached to each of the positive electrode sheet and the negative electrode sheet of the produced wound electrode body by welding, and the resultant configuration was accommodated in a battery case having an injection port.

A non-aqueous electrolytic solution was injected from the injection port, and the injection port was hermetically sealed with a sealing lid. The non-aqueous electrolytic solution was prepared by dissolving $LiPF_6$ as a support salt at a concentration of 1 mol/L in a mixed solvent with volume ratios of components of EC:DMC:EMC=30:40:30. An evaluation lithium ion secondary battery was thus obtained.

Activation Treatment

Activation treatment (initial charging) of each evaluation lithium ion secondary battery was performed in an environment of 25° C. The activation treatment was performed by a constant current—constant voltage method and involved constant-current charging up to 4.2 V with a current value of 1/3C and then constant-voltage charging until the current value reached 1/50C to fully charge the battery. Then, constant-current discharging was performed until the voltage reached 3.0 V at a current value of 1/3 C.

Initial Resistance Measurement

Each evaluation lithium ion secondary battery after the activation treatment was adjusted to a SOC (State of Charge) of 27% and then placed in a temperature environment of −30° C. Discharging was performed for 10 sec at a current value of 12 C, and a voltage drop amount (ΔV) was determined. A battery resistance was calculated by dividing the voltage drop amount ΔV by the discharge current value (12 C), and this was used as the initial resistance.

When the initial resistance of Comparative Example 1 was taken as 1, the initial resistance of Example 1 was 0.95. Therefore, since the moisture powder disclosed herein includes substantially no binder resin which can be a resistance component or a solvent which may adversely affect the battery performance and since the high viscosity of the non-aqueous electrolyte solution, it is possible to reduce the initial resistance of the secondary battery including the electrode composed of the moisture powder. That is, a moisture powder that is configured of aggregated particles including an electrode active material and a non-aqueous electrolytic solution, has a solid content ratio of 70% by mass or more when the total amount of the moisture powder is 100% by mass, and includes a non-aqueous electrolytic solution having a viscosity at 25° C. of 25 mPa·S or more makes it possible to suppress deterioration of battery performance and improve the electrode density.

The specific examples of the present disclosure have been described in detail above, but these are merely examples and do not limit the scope of claims. The techniques set forth in the claims are inclusive of various changes and modifications of the specific examples illustrated above.

What is claimed is:

1. A method for manufacturing a non-aqueous electrolyte secondary battery including an electrode body having a positive electrode and a negative electrode and a non-aqueous electrolytic solution, the method comprising:
    a step of mixing an electrode active material and the non-aqueous electrolytic solution including a non-aqueous solvent and a support salt to form a wet mixture, wherein a viscosity of the non-aqueous electrolytic solution at 25° C. is 25 mPa·S or more and 130 mPa·S or less;
    a step of granulating the wet mixture to form a moisture powder formed by aggregated particles including at least the electrode active material and the non-aqueous electrolytic solution;
    a step of supplying an electrode active material layer composed of the moisture powder onto an electrode current collector to form an electrode;
    a step of accommodating an electrode body in a battery case, the electrode body comprising the positive electrode and the negative electrode produced by using the electrode; and
    a step of injecting the non-aqueous solvent into the battery case where the electrode body is accommodated, the injected non-aqueous solvent mixing with the non-aqueous electrolytic solution in the electrode body to provide the non-aqueous electrolytic solution for the non-aqueous electrolyte secondary battery.

2. The method for manufacturing the non-aqueous electrolyte secondary battery according to claim 1, wherein a concentration of the support salt in the non-aqueous electrolytic solution in the mixing step is 2 mol/L or more and 5 mol/L or less.

3. The method for manufacturing a non-aqueous electrolyte secondary battery according to claim 1, wherein in the step of supplying the electrode active material layer, the electrode is formed by supplying the moisture powder between a first roll and a second roll disposed opposite to the first roll to adhere the electrode active material layer onto the outer peripheral surface of the second roll, and transferring the electrode active material layer from the outer peripheral surface of the second roll to a surface of the electrode current collector separately supplied to the second roll.

\* \* \* \* \*